Sept. 29, 1959  B. T. HENSGEN ET AL  2,905,967
SAUSAGE FORMING MACHINE

Filed Sept. 4, 1953  2 Sheets-Sheet 2

INVENTORS
BERNARD T. HENSGEN
HOWARD G. REICHEL
BY R. S. Story
ATTORNEY

United States Patent Office 2,905,967
Patented Sept. 29, 1959

2,905,967
SAUSAGE FORMING MACHINE

Bernard T. Hensgen and Howard G. Reichel, Chicago, Ill., assignors to Swift & Company, Chicago, Ill., a corporation of Illinois Application September 4, 1953, Serial No. 378,532

4 Claims. (Cl. 17—41)

The present invention relates to a method and apparatus for use in the preparation of comminuted food products.

Sausage is a typical example of the type of food product with which this invention deals. Many sausage products are normally prepared by filling a casing with the sausage mix which comprises a comminuted meat with suitable flavoring materials, etc. The need for the casing arises from the fact that such sausage mixes are loose and frangible, making it extremely difficult to handle without the use of a casing. Furthermore, during the cooking process the mix often has a tendency to change shape, crumble, etc. The use of a casing is undesirable because both the casing, the filling of the casing with sausage mix, and the removal of the casing, if that is done, involve items of expense which may be substantial facotrs in the finished cost of the product.

Various efforts have been made to improve these conventional practices. One proposal has been to use fixed molds, but generally speaking these do not substantially reduce the labor cost and often will change the texture characteristics and the like of the finished product. Another proposal has been to coagulate the surface protein while having the center portion of the product relatively unaffected so as to form a shell of coagulated meat about the usual product. This has the disadvantage that the shell, unless it is removed, has a different texture than that of the remaining product which in effect makes no substantial change from the conventional practices of using a casing which has a different texture from the inner portion of the sausage.

The principal object of the present invention is to provide a method and apparatus for molding a food mix, for example a pork sausage, into the desired form, generally that of a cylinder, which may be handled externally of any mold, casing, or the like, through the desired processing for the particular product involved. A particular advantage of the invention is that the product holds together not only for the initial handling before the processing, but also during the cooking when many such materials tend to fall apart. Another advantage is that the surface of the product has the smooth appearance generally associated with a sausage prepared in a casing.

A further advantage of the invention is in the ability to use conventional components for the majority of the structure. The number of specially fabricated parts that are neded is very small as will be apparent from the following description.

Other objects and advantages will be apparent from the following description taken in conjunction with the drawings in which.

The method of forming that we have devised is based on the concept of first molding the product into a shape roughly corresponding to that desired and then wiping a surface layer from the product while compressing the remainder of the product. This compresses and smooths out the remaining surface layer to provide a coating that is closely knit and bound together. This step may be repeated a number of times in order to further solidify the product and in some embodiments there may be interposed between the steps a compressing of the product without the wiping action of the preceding and following steps.

Preferably before this forming takes place the fibers of the product are disoriented, to knit the product together and reduce its frangibility. Furthermore, it causes the product to hold its shape better during the subsequent cooking. The combination of the disorientation plus the subsequent wiping and compressing steps produce a dense product having a high uniformity in weight per unit of size.

After the product has been so molded, it may be cut into lengths and either packaged for sale in the form in which it then exists or it may be cooked before packaging. Various types of cooking may be employed depending upon the type of product involved. It may be a dry heat cooking, a steam cooking, a deep fat cooking, or a combination of these. In the case of pork sausage discussed herein, an apparatus such as that illustrated in Patent No. 2,529,253, the disclosure of which is included herein by reference, may be utilized to perform the cooking.

Figure 1:
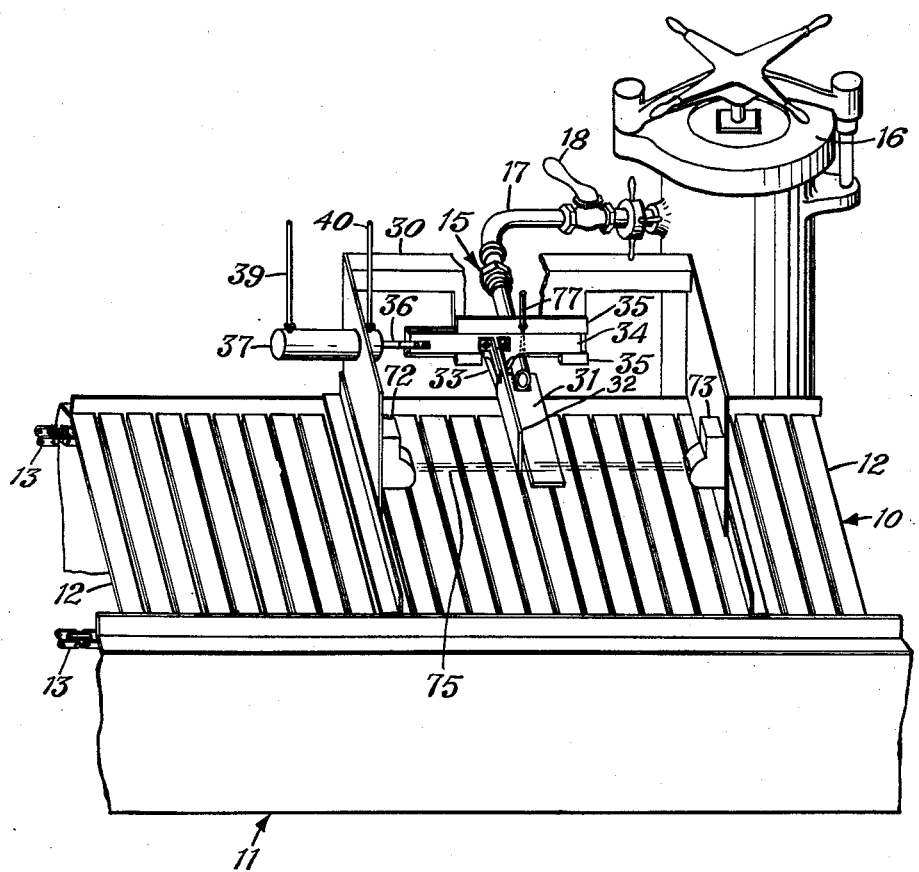
Figure 1 is an isometric view of a portion of an embodiment of the invention with certain of the parts broken away for greater clarity.

Referring to Figure 1, a conveyor generally 10 is mounted on a frame generally 11, only a portion of which is shown. Conveyor 10 is formed of a plurality of slats 12 attached to and supported by chains 13. Inasmuch as the conveyor normally will carry the product through suitable cooking devices the slats 12 are of metal.

The extrusion nozzle 15 is connected to a sausage stuffer 16 by means of a pipe 17. A valve 18 in pipe 17 allows the operator to control the flow of the sausage mix from the stuffer to the nozzle. The stuffer 16 may be a conventional apparatus of the type referred to at page 48 et seq. of the publication "Sausage and Ready To Serve Meats," published by the Institute of Meat Packing in 1938, the disclosure of which is included herein by reference.

Figure 3:
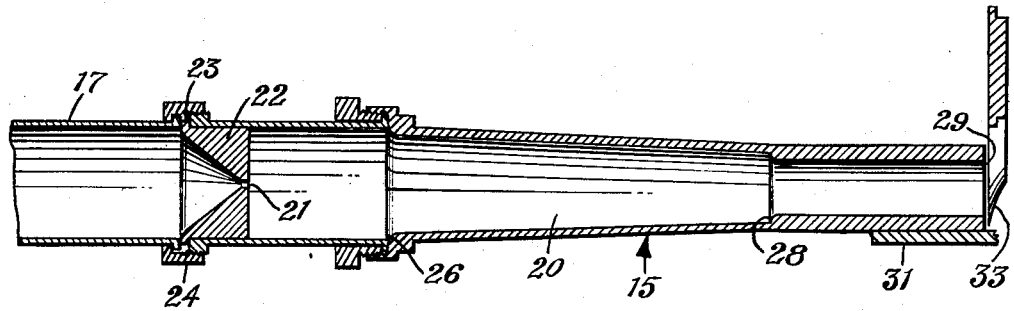
Figure 3 is a sectional elevation of the extrusion nozzle with the cutoff blade at the end of the nozzle but omitting the pusher on the cutoff blade.

The structure of the nozzle is best shown in Figure 3. The nozzle 15 is formed by a hollow body having an axial opening 20 therein. At the upstream end of opening 20 is a small orifice 21, the entrance to which is tapered. The orifice 21 is formed in a removable block 22. The block has a peripheral flange 23 which is locked in a flange coupling 24 between the pipe 17 and the nozzle 15. A short distance downstream from orifice 21 is a constrictor 26 which abruptly reduces the diameter of opening 20. Constrictor 26 is formed at a joint in the nozzle for convenience in manufacture and cleaning. Downstream from constrictor 26 is a second abrupt constrictor, or step, 28 in the internal opening 20. Between constrictor 26 and constrictor 28 the opening 20 gradually tapers to a smaller internal diameter. Beyond constrictor 28 opening 20 is cylindrical to the downstream end 29 of the nozzle body.

The nozzle 15 is suitably secured in an upstanding portion 30 of frame 11. Immediately below nozzle 15 is a fixed platform 31 secured to the nozzle. Just beyond the downstream end 29 of the nozzle 15 and slightly above platform 31 is a cutoff blade 33. Blade 33 is positioned normal to the axis of the nozzle 15 and is secured to a slide 34 mounted in ways 35 attached to the upstanding portion 30 of frame 11. Attached to slide 34 and extending outwardly therefrom at right angles is a pusher 32 to displace the product from platform 31. The piston rod 36 of a double-acting air cylinder 37 is attached to slide 34.

Pipes 39 and 40 are connected to the opposite ends of cylinder 37 and to a four-way control valve 41. Air under pressure is supplied to control valve 41 through a pipe 42 and the exhaust from valve 41 is through pipe 43. The valve actuating rod 45 of valve 41 carries a pair of armatures 46 and 47. Operatively associated with armatures 46 and 47 are a pair of solenoids 48 and 49, respectively. Also on the same end of rod 45 as armature 46 are a pair of spaced, insulated stops 51 and 52, while a similar pair of spaced, insulated stops 53 and 54 are on the same end of rod 45 as armature 47. A switch lever 56 is positioned to be contacted by stops 51 and 52 and a switch lever 57 is positioned to be contacted by stops 53 and 54. A pair of spaced switch contacts 58 and 59 are operatively associated with switch lever 56 while a similar pair of spaced contacts 60 and 61 are operatively associated with switch lever 57. Solenoid 49 is connected in series with switch contact 60 and with switch contact 58, while solenoid 48 is connected in series with switch contacts 59 and 61.

The two switch levers 56 and 57 are connected in series with a suitable source of power, as represented by battery 64, an actuating coil 65 for relay 66, and the normally opened contact 67 of relay 66. A second actuating coil 69 for relay 66 is connected to an electric eye control apparatus generally 70. Also connected to control apparatus 70 is an electric eye 71 and a source of light 72. Power for the electric eye control apparatus 70 is supplied through wires 73. The details of the electric eye control apparatus 70 forms no part of the instant invention and may be of conventional design. Such type of apparatus is illustrated and described on page 183 et seq. of the publication "Handbook of Industrial Electronic Circuits," published by McGraw-Hill Book Company, Inc. in 1948, the disclosure of which is included herein by reference.

Referring to Figure 1 the light source 72 is attached to the upstanding portion 30 of frame 11 and positioned to project a beam of light 75 along a predetermined line above and adjacent the end of platform 31. The electric eye 71 is attached to the frame in a position to intercept the beam of light 75.

In the illustrated embodiment the apparatus is used for preparing a cooked pork sausage. The sausage mix is placed in stuffer 16 which is actuated to extrude the mix through pipe 17. As the mix flows through the orifice 21 it tends to curl about the sides of the downstream end of the orifice producing a disorientation of the fibers. The pressure supplied by stuffer 16 is preferably on the order of 200 pounds per square inch, which is much in excess of that conventionally used in sausage stuffing operations. This pressure is maintained by reason of the small size of the orifice 21. With this pressure and with the small size of the orifice the fat globules in the mix are broken down to provide a fine homogeneous dispersion of fat globules in the mix, with the result that the finished product is fine grained. As the product is pushed on through nozzle 15 and moves past constrictor 26, the constrictor wipes a surface layer from the product and at the same time compresses the product that passes through the constrictor. The product is then further compressed as it passes through the tapered section of opening 20. Upon reaching the second constrictor 28 there is a further wiping of a layer of the surface of the product and additional compression of the remainder of the product which then passes on out through the end of the downstream end of the nozzle.

From the end 29 of nozzle 15 the molded product slides out onto platform 31. To facilitate the product sliding along the platform a spray of water from nozzle 77 is directed down onto the product on the platform. By reason of the molding the cylinder of product continues its movement straight out across platform 31 until it intercepts light beam 75.

Figure 2:
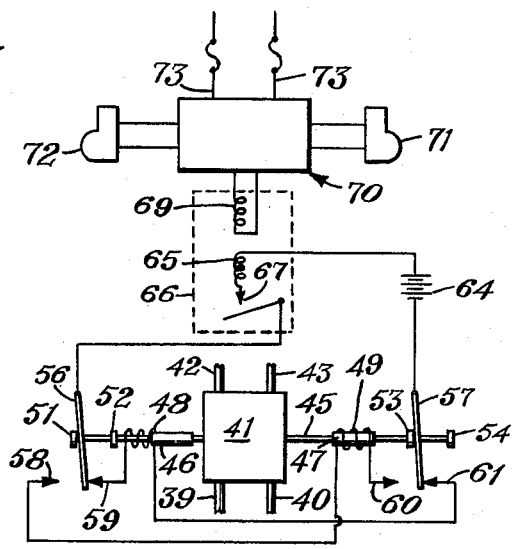
Figure 2 is a diagrammatic representation of the control system.

When light beam 75 is cut the electric eye control mechanism 70 momentarily energizes coil 69 to close the normally opened contacts 67 of relay 66. With the valve stem 45 positioned as shown in Figure 2 the closing of contact 67 completes a circuit through battery 64, switch arm 57, contact 61, solenoid 48, contact 59 and switch arm 56. Armature 46 is drawn into solenoid 48 to move valve stem 45 and change the position of valve 41. As the valve stem 45 approaches the end of its stroke, stop 52 contacts switch arm 56 and stop 54 contacts switch arm 57 to move the two switch arms to the left in Figure 2. During the instant that the switch arms 56 and 57 are spaced between their respective contacts, the circuit is broken through battery 64 and relay 66 so as to allow the relay to open. The momentum of valve stem 45 carries the two switch arms 56 and 57 into engagement with contacts 58 and 60. However, contacts 67 having opened, the circuit is not closed.

The changed position of the stem 45 of valve 41 reverses the application of air pressure and exhaust of cylinder 37 so as to cause the piston and the piston rod 36 to move to the other limit of its stroke. Piston rod 36 moves slide 34 and the attached cutoff blade 33 which sweeps across the end 29 of nozzle 15 to sever the cylinder of product resting on platform 31 from the remaining product and to push that cylinder across platform 31 to drop onto the top of conveyor 10. It will be noted that the blade not only severs the product into lengths, but, in addition, quickly moves those lengths out of the way of the product that continues to flow from the nozzle.

With the passage of blade 33 a new cylinder of product begins to form on platform 31, which cylinder eventually cuts beam 75. The cutting of the beam again momentarily energizes coil 69 to close contact 67, this time forming a series circuit through the battery 64, switch lever 57, contact 60, solenoid 49, contact 58, and switch lever 56. The energizing of solenoid 49 draws in armature 47 to return the valve stem 45 to the position shown in Figure 2. The changed position of valve 41 reverses the application of air and exhaust to cylinder 37 to draw slide 34 and blade 33 to the position illustrated in Figure 1, cutting off another cylinder of product and dropping it onto conveyor 10.

The foregoing description of a specific embodiment is for the purpose of compliance with 35 U.S.C. 112, and we do not desire to be limited to the exact details shown and described, for obvious modifications will occur to a person skilled in the art. For example, various numbers of constrictors may be employed. The step of constriction may be performed without the preceding step of disorientation. The particular combination employed will depend a great deal upon the characteristics of the product being handled. However, with pork sausage we have found that the use of both disorientation and constriction is extremely desirable, with two steps of constriction being sufficient to produce suitable results.

Figure 4:
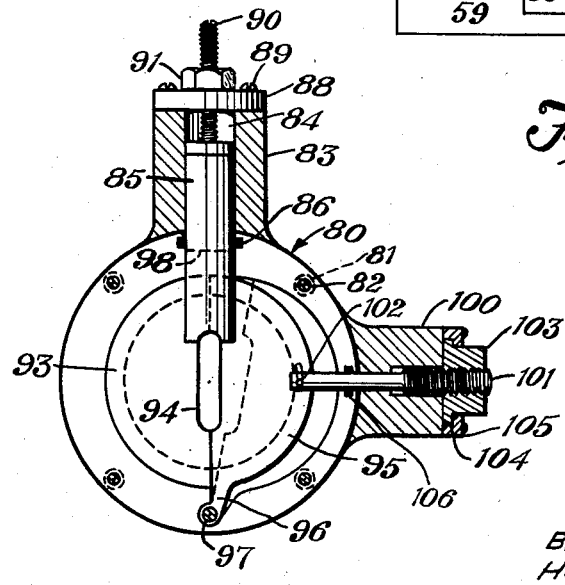
Figure 4 is a transverse section of an alternate form of orifice.

Other types of orifices may be used to obtain the disorientation of the fibers of the product. One of these is illustrated in Figure 4. In this instance the orifice is devised to be an insert between a pair of flanges (not shown) in a pipe. The body generally 80 has a series of holes 81 aligned with the openings in the pipe flanges, with bolts 82 being inserted through the holes in the body and the holes in the pipe flanges to hold the structure in the pipe. Suitable gaskets (not shown) are used to seal the joints in a manner well-known in the art. At one side of the body is a first boss 83 which has a drilled opening 84 to receive an adjustment cylinder 85. A packing ring 86 is inserted in the body about cylinder 85 to seal the space about the cylinder. At the end of boss 83 is a plate 88 attached to the boss by means of screws 89. Plate 88 is threaded to receive an adjustment screw 90 which is rotatably secured in the end of adjusting cylinder 85. A lock nut 91 is used on screw 90 to hold it in the desired position.

A flat plate 93 is secured within the central opening of body 80. The plate is semicircular with an elongated orifice opening 94 being partially cut out of the diametric edge of the plate. A second substantially semicircular plate 95 is positioned coplanar with plate 93. Again part of the orifice opening 94 is cut out of plate 95. An arm 96 extending from plate 95 is pivotally attached to body 80 by means of a screw 97. Adjusting cylinder 85 has a slot cut in the bottom thereof and extending as far up as line 98. The slot is sufficiently wide so that the cylinder will slip over plates 93 and 95 and the cylinder will move up and down with respect to the plates.

A second boss 100 extends from body 80 to hold an adjusting stem 101. One end of stem 101 is attached to plate 95 by means of a pin 102, while the other end is threaded to receive adjusting nut 103. Nut 103 has a peripheral flange 104 with which it is held in place by a ring 105 secured to boss 100. A packing ring 106 in body 80 is positioned about adjusting stem 101 to seal the stem in the body.

The type of orifice illustrated in Figure 4 has two advantages. In the first place cylinder 85 may be moved up and down on plates 93 and 95 to change the effective area of orifice 94. Thus, different grinds of meat mixtures may be accommodated. With a fixed orifice such as illustrated in Figure 3 it will be found necessary in many instances to change the size of the orifice to accommodate different products by changing blocks 22.

Secondly, the orifice of Figure 4 may be readily cleared should it become obstructed for some reason or another. This is done by turning adjusting nut 103 to move plate 95 away from plate 93. This opens up the orifice 94 to permit the obstructing material to pass through the orifice. As soon as the orifice is swept clean, adjusting nut 103 may be turned to move plate 95 back against plate 93 to restore the orifice to its original dimensions. Thus no disassembling of the parts is required to clear the orifice.

We claim:

1. An extrusion nozzle for molding comminuted food products, said nozzle including a body having walls forming a single inner opening through which said products are extruded in a given direction under pressure, the inner side of said walls forming at least one abrupt continuous peripheral constrictor which reduces the diameter of said opening for the product flowing through the opening the portions of the inner side of said walls in said direction from said constrictor being reduced in size, said walls also forming an orifice within said opening upstream from said constrictor.

2. An extrusion nozzle for molding comminuted food products, said nozzle including a body having walls forming a single inner opening through which said products are extruded in a given direction under pressure, the inner side of said walls forming a plurality of abrupt continuous peripheral constrictors for the product flowing through the opening with each constrictor being longitudinally spaced from and smaller than the preceding constrictor, the portions of the inner side of said walls between the constrictors being gradually tapered in said direction to a reduced size.

3. An extrusion nozzle for molding comminuted food products, said nozzle including a body having walls forming a single inner opening through which said products are extruded in a given direction under pressure, the inner side of said walls forming a plurality of continuous peripheral constrictors for the product flowing through the opening with each constrictor being longitudinally spaced from and smaller than the preceding constrictor, the portions of the inner side of said walls between the constrictors being gradually tapered in said direction to a reduced size, said walls also forming an orifice within said opening upstream from said constrictors, and means to vary the size of said orifice.

4. An extrusion nozzle for molding comminuted food products, said nozzle including a body having walls forming a single inner opening through which said products are extruded in a given direction under pressure, the inner side of said walls forming a plurality of continuous peripheral constrictors for the product flowing through the opening with each constrictor being longitudinally spaced from and smaller than the preceding constrictor, the portions of the inner side of said walls between the constrictors being gradually tapered in said direction to a reduced size, a member within said opening upstream from said constrictors, said member having an orifice therein, said member being in two parts with the line of juncture intersecting said orifice, and means operable from outside said nozzle for moving one of said parts toward and away from the other of the parts.

References Cited in the file of this patent

UNITED STATES PATENTS

| | | |
|---|---|---|
| 765,295 | Napier | July 19, 1904 |
| 826,216 | Asbury | July 17, 1906 |
| 1,471,727 | Gomez | Oct. 23, 1923 |
| 1,776,597 | Poeppel et al. | Sept. 23, 1930 |
| 2,020,843 | Lohner | Nov. 12, 1935 |
| 2,037,892 | Gleason | Apr. 21, 1936 |
| 2,085,108 | Louisot et al. | June 29, 1937 |
| 2,208,651 | Wallace | July 23, 1940 |
| 2,209,824 | Louisot et al. | July 30, 1940 |
| 2,217,135 | Parish | Oct. 8, 1940 |
| 2,325,446 | Walter | July 27, 1943 |
| 2,386,775 | Balzarini | Oct. 16, 1945 |
| 2,529,253 | Hoffman et al. | Nov. 7, 1950 |
| 2,542,673 | Hedwall | Feb. 20, 1951 |
| 2,568,491 | Edwards | Sept. 18, 1951 |
| 2,634,458 | Elsaesser | Apr. 14, 1953 |
| 2,660,755 | Zaenkert | Dec. 1, 1953 |
| 2,705,927 | Graves et al. | Apr. 12, 1955 |